(12) United States Patent
Tsubaki et al.

(10) Patent No.: US 9,637,166 B2
(45) Date of Patent: *May 2, 2017

(54) ELECTRIC POWER STEERING APPARATUS

(71) Applicant: NSK LTD., Tokyo (JP)

(72) Inventors: Takahiro Tsubaki, Gunma (JP); Tetsuya Kitazume, Gunma (JP); Keita Yoshida, Gunma (JP)

(73) Assignee: NSK LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/418,372

(22) PCT Filed: Feb. 4, 2014

(86) PCT No.: PCT/JP2014/052495
§ 371 (c)(1),
(2) Date: Jan. 29, 2015

(87) PCT Pub. No.: WO2014/162769
PCT Pub. Date: Oct. 9, 2014

(65) Prior Publication Data
US 2015/0191199 A1 Jul. 9, 2015

(30) Foreign Application Priority Data

Apr. 4, 2013 (JP) .................. 2013-078517
Apr. 15, 2013 (JP) .................. 2013-084511

(51) Int. Cl.
*B62D 5/04* (2006.01)
*B62D 1/28* (2006.01)
(Continued)

(52) U.S. Cl.
CPC .......... *B62D 5/0463* (2013.01); *B62D 1/286* (2013.01); *B62D 6/002* (2013.01); *B62D 6/003* (2013.01); *B62D 6/10* (2013.01); *B62D 15/025* (2013.01)

(58) Field of Classification Search
CPC ........ B62D 5/0463; B62D 6/003; B62D 6/10; B62D 1/286; B62D 6/002; B62D 15/025
See application file for complete search history.

(56) References Cited

U.S. PATENT DOCUMENTS

2003/0050748 A1* 3/2003 Iwazaki ............. B62D 15/0285
701/41
2006/0069481 A1* 3/2006 Kubota ................ B62D 5/0463
701/41
(Continued)

FOREIGN PATENT DOCUMENTS

JP 08-310417 A 11/1996
JP 2001-039325 A 2/2001
(Continued)

OTHER PUBLICATIONS

International Search Report of PCT/JP2014/052495 dated Apr. 28, 2014.

*Primary Examiner* — Michael D Lang
(74) *Attorney, Agent, or Firm* — Sughrue Mion, PLLC

(57) ABSTRACT

Although the steering angle control of a steering wheel is performed using automatic steering control, when the steering torque is applied by the steering wheel operation of the driver, the target steering angle is corrected to become the same direction as a direction that the steering torque is applied, and the steering angle control is performed to coincide with that target steering angle. Thereby, in the case of adding together outputs of the steering angle control with respect to the corrected target steering angle and the assist control by the steering torque with a certain ratio, it is possible to make the output direction of the automatic steering control coincide with the output direction of the manual steering control, and the control outputs become hard to interfere with each other. As a result, the uncom- (Continued)

fortable feeling given to the driver that occurs in switching the steering mode is reduced.

10 Claims, 13 Drawing Sheets

(51) Int. Cl.
    *B62D 6/00*     (2006.01)
    *B62D 6/10*     (2006.01)
    *B62D 15/02*     (2006.01)

(56) References Cited

U.S. PATENT DOCUMENTS

| | | | |
|---|---|---|---|
| 2006/0089770 A1* | 4/2006 | Ito | B62D 1/286 701/41 |
| 2006/0090952 A1 | 5/2006 | Ito | |
| 2010/0001680 A1* | 1/2010 | Sasaki | B62D 5/046 318/675 |
| 2010/0198462 A1* | 8/2010 | Shinoda | B62D 5/046 701/41 |
| 2014/0163822 A1* | 6/2014 | Strecker | B62D 6/04 701/42 |
| 2015/0217801 A1* | 8/2015 | Takeda | B62D 6/008 701/42 |

FOREIGN PATENT DOCUMENTS

| | | |
|---|---|---|
| JP | 2002-120745 A | 4/2002 |
| JP | 2002-369565 A | 12/2002 |
| JP | 2004-017881 A | 1/2004 |
| JP | 2004-042769 A | 2/2004 |
| JP | 2004-256076 A | 9/2004 |
| JP | 2006-123663 A | 5/2006 |
| JP | 3912279 B2 | 5/2007 |
| JP | 4057955 B2 | 3/2008 |
| JP | 4110040 B2 | 7/2008 |
| JP | 2010-100091 A | 5/2010 |

\* cited by examiner

PRIOR ART

ELECTRIC POWER STEERING APPARATUS

CROSS REFERENCE TO RELATED APPLICATIONS

This is a National Stage of International Application No. PCT/JP2014/052495 filed Feb. 4, 2014, claiming priority based on Japanese Patent Application No. 2013-078517 filed Apr. 4, 2013 and Japanese Patent Application No. 2013-084511 filed Apr. 15, 2013, the contents of all of which are incorporated herein by reference in their entirety.

TECHNICAL FIELD

The present invention relates to an electric power steering apparatus that has functions of an automatic steering control (parking support mode) and a manual steering control and provides a steering system of a vehicle with an assist force generated by a motor, and in particular to an electric power steering apparatus capable of further improving safety by switching so as to give priority to a steering by a driver in the case that a steering direction of the automatic control is different from a direction of the steering wheel steering by the driver when the driver steers a steering wheel during the automatic steering control, and improving steering performance by assigning a gradual variation gain to a motor velocity command value in the automatic steering control and concurrently providing a limiter capable of changing (variable) a limit value.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus will be described with reference to FIG. 1. As shown in FIG. 1, a column shaft (a steering shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command based on a steering torque Th detected by the torque sensor 10 and a vehicle velocity Vel detected by a vehicle velocity sensor 12, and controls a current supplied to the motor 20 based on a current control value E obtained by performing compensation and so on with respect to the steering assist command value. Moreover, it is also possible to receive the vehicle velocity Vel from a CAN (Controller Area Network) and so on.

In such an electric power steering apparatus, the control unit 100 has a configuration such as disclosed in Japanese Published Unexamined Patent Application No. 2002-369565 A.

As shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Th from the torque sensor 10 and the vehicle velocity Vel from a vehicle velocity detecting system are inputted into the control unit 100. In the motor 20, a motor inter-terminal voltage Vm and a motor current value i are measured and outputted.

The control unit 100 comprises a torque system control unit 110 indicated by a dashed line that performs a control by using the steering torque Th and a motor system control unit 120 indicated by a dashed-dotted line that performs a control relating to driving of the motor 20. The torque system control unit 110 comprises an assist amount calculating section 111, a differential control section 112, a yaw rate convergence control section 113, a robust stabilization compensating section 114 and an SAT (Self Aligning Torque) estimation feedback section 115, addition sections 116A and 116B, and a subtraction section 116C. Further, the motor system control unit 120 comprises a compensating section 121, a disturbance estimating section 122, a motor angular velocity calculating section 123, a motor angular acceleration calculating section 124, a motor characteristic compensating section 125, and addition sections 126A and 126B.

The steering torque Th is inputted into the assist amount calculating section 111, the differential control section 112, the yaw rate convergence control section 113 and the SAT estimation feedback section 115, and all of them input the vehicle velocity Vel as a parameter. The assist amount calculating section 111 calculates an assist torque amount based on the steering torque Th. The yaw rate convergence control section 113 inputs the steering torque Th and a motor angular velocity ω, and brakes a movement that the steering wheel whirls to improve the convergence of yaw of the vehicle. Further, the differential control section 112 enhances control responsibility in the vicinity of a neutral point of the steering and realizes a smooth steering. Moreover, the SAT estimation feedback section 115 inputs the steering torque Th, a signal obtained in the addition section 116A by adding the output of the differential control section 112 to the output of the assist amount calculating section 111, the motor angular velocity ω calculated by the motor angular velocity calculating section 123 and a motor angular acceleration α from the motor angular acceleration calculating section 124 to estimate an SAT, performs signal processing by using a feedback filter with respect to the estimated SAT, and provides the steering wheel with suitable road information as a reaction force.

Further, a signal that is obtained in the addition section 116B by adding the output of the yaw rate convergence control section 113 to a signal obtained in the addition section 116A by adding the output of the differential control section 112 to the output of the assist amount calculating section 111, is inputted into the robust stabilization compensating section 114 as an assist amount AQ. For example, the robust stabilization compensating section 114 is a compensating section disclosed in Japanese Published Unexamined Patent Application No. H8-290778 A, removes peak values in a resonance frequency of a resonance system comprised of an inertia element and a spring element that are included in the detected torque, and compensates a phase shift of the resonance frequency that disturbs the responsibility and the stability of the control system. By subtracting the output of the SAT estimation feedback section 115 from the output of the robust stabilization compensating section 114 in the subtraction section 116C, an assist amount Ia capable of transmitting the road information to the steering wheel as the reaction force, is obtained.

Moreover, the motor angular velocity calculating section 123 calculates the motor angular velocity ω based on the motor inter-terminal voltage Vm and the motor current value i, and the motor angular velocity ω is inputted into the motor angular acceleration calculating section 124, the yaw rate convergence control section 113 and the SAT estimation feedback section 115. The motor angular acceleration calculating section 124 calculates the motor angular acceleration α based on the inputted motor angular velocity ω, and the calculated motor angular acceleration α is inputted into the motor characteristic compensating section 125. In the addition sections 126A, the assist amount Ia obtained by subtracting the output of the SAT estimation feedback section 115 from the output of the robust stabilization compensating section 114, is added to the output Ic of the motor characteristic compensating section 125, and then this added signal is inputted into the compensating section 121 comprised of a differential compensating section or the like as a current command value Ir. A signal that is obtained by adding the output of the disturbance estimating section 122 in the addition section 126B to a current command value Ira obtained by compensating the current command value Ir by means of the compensating section 121, is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system based on a signal obtained by adding the output of the disturbance estimating section 122 to the current command value Ira compensated by the compensating section 121 that is the control target of the motor output and the motor current value i, and does not lose the stability of the control system.

In such an electric power steering apparatus, recently, vehicles equipped with a parking support function (parking assist) that switch between the automatic steering control and the manual steering control appear. In a vehicle equipped with the parking support function, a target steering angle is set based on data from a camera (image), a distance sensor or the like, and the automatic steering control which makes an actual steering angle follow up the target steering angle, is performed.

In an electric power steering apparatus having conventionally well-known functions of the automatic steering control (parking support mode) and the manual steering control, a back parking and a parallel parking are performed automatically by controlling an actuator (a motor) base on a pre-stored relation between a moving distance of the vehicle and a turning angle.

Then, a conventional steering control apparatus calculates a motor current command value so as to make an actual steering angle coincide with the target steering angle set dependent on the vehicle and realizes the automatic steering control. For example, in an automatic steering device disclosed in Japanese Patent No. 4057955 B2 (Patent Document 1), when switching from a steering angle control to a torque assist control, an uncomfortable feeling in control switching is reduced by changing a fade shift time depending on an assist torque amount. Further, in an automatic steering device disclosed in Japanese Patent No. 4110040 B2 (Patent Document 2), a target steering angle is corrected so as to be capable of reaching a target position in the case that a steering torque is large.

THE LIST OF PRIOR ART DOCUMENTS

Patent Documents

Patent Document 1: Japanese Patent No. 4057955 B2
Patent Document 2: Japanese Patent No. 4110040 B2
Patent Document 3: Japanese Patent No. 3912279 B2

SUMMARY OF THE INVENTION

Problems to be Solved by the Invention

During the automatic steering control of an electric power steering apparatus that performs an automatic steering which makes an actual steering angle follow up a target steering angle, in the case of determining that the driver steered the steering wheel, it is preferred to terminate the automatic control and smoothly switch to the assist control of the manual steering control.

Although the automatic steering control performs a control so as to make the actual steering angle coincide with the target steering angle, in the case that the driver operates the steering mechanism to apply the steering torque, the actual steering angle departs from the target steering angle. Therefore, the automatic steering control outputs a motor current command value in a direction opposite to the steering torque so as to make the actual steering angle coincide with the target steering angle and oppose against the steering torque.

On the other hand, since the assist control outputs so as to assist the steering torque, the assist control outputs a motor current command value in the same direction as the steering torque. Therefore, in switching from the automatic steering control in the case that the steering torque is applied to the manual steering control, since respective outputs become opposite directions, the automatic steering control is gradually switched to the manual steering control by a fade processing after the steering torque is applied by the driver and a temporary assist in a direction opposite to the steering torque by the automatic steering control is performed. That is to say, an assist in the same direction as the steering torque is performed. This becomes a feeling of being caught in switching from the automatic steering control to the manual steering control for the driver, i.e. becomes the uncomfortable feeling.

In the case that the automatic steering is realized in the electric power steering apparatus (EPS), a configuration that has the steering angle control of the automatic steering control and the assist control (a torque control) of the manual steering control separately and switches between these outputs, is commonly used. A position and velocity control having excellent performances in a responsibility and a disturbance suppressibility is used in the steering angle control, the position control is comprised of a P (Proportional) control, and the velocity control is comprised of a PI (Proportional and Integral) control or the like. When switching abruptly by a switch or the like in switching of outputs, since the current command value varies rapidly and the steering wheel behavior becomes unnatural, the uncomfortable feeling is given to the driver. Therefore, a method that suppresses a rapid variation in the current command value by multiplying a steering angle control command value and an assist control command value by a gradual variation gain to gradually switch, is used.

However, in this method, since the steering angle control command value is limited by the gradual variation gain in switching and outputted as the current command value, with respect to the steering angle control command value, the current command value becomes small as much as the amount limited. Due to this limit, since an actual velocity of the motor becomes slow with respect to the motor velocity command value, a deviation occurs between the motor velocity command value and the actual velocity and an integral value of the I-control within the velocity control accumulates, hence a larger steering angle control command value is outputted from the velocity control. As a result of this, in a state that the gradual variation gain gradually becomes large, since the limit by the gradual variation gain is eased, the steering angle control command value becomes an excessive value as the gradual variation gain becomes large, the steering wheel excessively responds to the motor velocity command value, consequently the uncomfortable feeling is given to the driver.

As a technique for being multiplied by the gradual variation gain, for example, there is a steering control apparatus disclosed in Japanese Patent No. 3912279 B2 (Patent Document 3). In the apparatus of Patent Document 3, a method that controls so as to gradually increase the steering angle velocity at the start of the steering angle control to reduce the uncomfortable feeling given to the driver that is caused by a steering wheel's rapid variation at the start of the steering angle control, is proposed.

However, in the method of Patent Document 3, when the gradual variation starts, since the gradual variation continues to increase until reaching an upper limit value, there is a problem that the integral value of the I control excessively accumulates.

The present invention has been developed in view of the above-described circumstances, and the first object of the present invention is to provide a high-performance electric power steering apparatus that is capable of smoothly switching the steering when the driver steers the steering wheel during the automatic steering control so as not to give the uncomfortable feeling to the driver. Further, the second object of the present invention is to provide a high-performance electric power steering apparatus that is capable of performing an automatic control that the driver and fellow passengers do not feel surprise and a discomfort feeling by the suppressing steering behavior and the vehicle behavior that have a rapid variation at the start of the steering by the automatic steering control in a vehicle having the automatic steering control (the parking support mode) and the manual steering control.

Means for Solving the Problems

The present invention relates to an electric power steering apparatus that calculates a first motor current command value based on a steering torque and a vehicle velocity, performs an assist control of a steering system by driving a motor based on said first motor current command value, and has a function for switching between an automatic steering control and a manual steering control, the above-described object of the present invention is achieved by that comprising: a target steering angle correcting section that outputs a target steering angle correction value to said steering torque; a correction output section that corrects a target steering angle with said target steering angle correction value to output a corrected target steering angle; a steering angle control section that calculates a second motor current command value based on said corrected target steering angle from said correction output section, an actual steering angle and a motor angular velocity of said motor; and a switching section that inputs said first motor current command value and said second motor current command value to switch, wherein said switching section is switched depending on a switching command of said automatic steering control and said manual steering control, and said motor is drive-controlled based on said second motor current command value in said automatic steering control.

Further, the present invention relates to an electric power steering apparatus that performs an assist control of a steering system by driving a motor based on a motor current command value, and has a function for switching between an automatic steering control and a manual steering control, the above-described object of the present invention is achieved by that comprising: a torque control section that calculates a first current command value in said manual steering control based on a steering torque and a vehicle velocity; a steering angle control section that calculates a second current command value in said automatic steering control so as to bring an actual steering angle close to a target steering angle set based on a moving target position of a vehicle; a gain adjusting section that generates a steering angle control gradual variation gain and an assist control gradual variation gain in said automatic steering control; and an output section that multiplies said first current command value by said assist control gradual variation gain, multiplies said second current command value by said steering angle control gradual variation gain, performs an addition of said respective multiplication results and makes a result of said addition as said motor current command value.

Effects of the Invention

According to an electric power steering apparatus (the first embodiment) of the present invention, although the steering angle control of the steering wheel is performed in the automatic steering control such as the parking support, the automatic running or the like, when the steering torque is applied by the driver, the target steering angle is corrected so as to become the same direction as a direction that the steering torque is applied, and the steering angle control is performed so as to coincide with that target steering angle. Thereby, in the case of adding together outputs of the steering angle control with respect to the corrected target steering angle and the assist control by the steering torque with a certain ratio each other, it is possible to make the direction of the output of the automatic steering control coincide with the direction of the output of the manual steering control, since the control outputs become hard to interfere with each other, it is possible to reduce the uncomfortable feeling given to the driver that occurs in switching. This also leads to improvement of safety with respect to the driver.

Further, in the present invention, with respect to a rapid target steering angle, since the smoothing of the rapid target steering angle is performed to control, the driver does not feel an uneasy feeling even in the automatic operation.

According to an electric power steering apparatus (the second embodiment) of the present invention, the motor velocity command value calculated within a steering angle control section is gradually varied by being multiplied by the gradual variation gain, upper and lower limit values of that output are limited by a limiter and the limit value of the limiter is changed (varied) depending on the gradual variation gain. Therefore, the steering angle control command value is limited in switching of the manual steering control (the assist control) and the automatic steering control (the steering angle control), it can be prevented that the integral value of the I-control within the velocity control excessively accumulates. As a result of this, it is possible to suppress an unintended steering wheel behavior, and it is possible to reduce the uncomfortable feeling given to the driver.

MODE FOR CARRYING OUT THE INVENTION

Although the steering angle control of the steering wheel is performed in the automatic steering control such as the parking support, the automatic running or the like, when the steering torque is applied by the steering wheel operation of the driver, the target steering angle is corrected so as to become the same direction as a direction that the steering torque is applied, and the steering angle control is performed so as to coincide with that target steering angle. Thereby, in the case of adding together outputs of the steering angle control with respect to the corrected target steering angle and the assist control by the steering torque with a certain ratio each other, it is possible to make the output direction of the automatic steering control coincide with the output direction of the manual steering control, and the control outputs become hard to interfere with each other. As a result of this, it is possible to reduce the uncomfortable feeling given to the driver that occurs in switching the steering mode.

Hereinafter, embodiments of the present invention will be described in detail with reference to the accompanying drawings.

Figure 1:
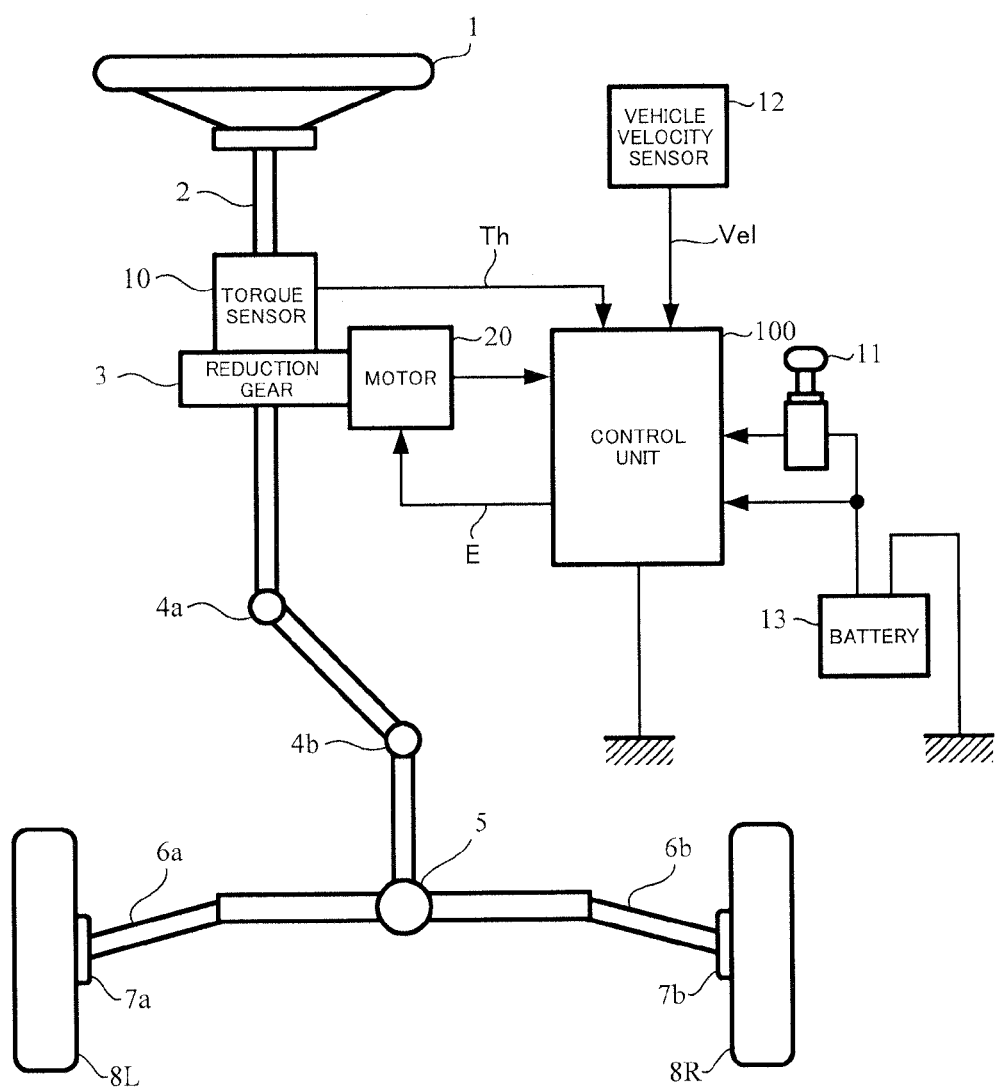
FIG. 1 is a configuration diagram illustrating a general outline of an electric power steering apparatus.
Figure 2:
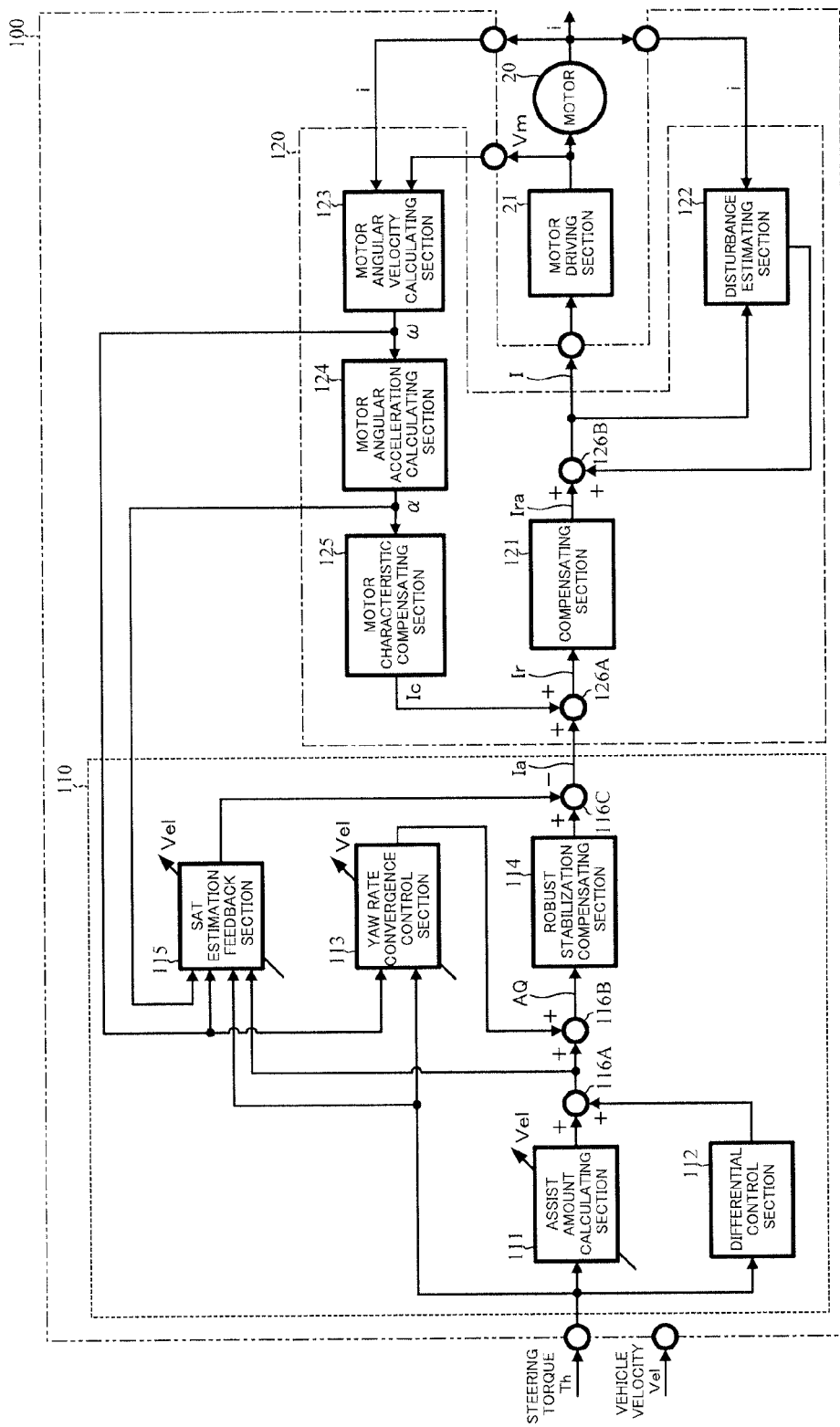
FIG. 2 is a block diagram showing a configuration example of a control system of the electric power steering apparatus.
Figure 3:
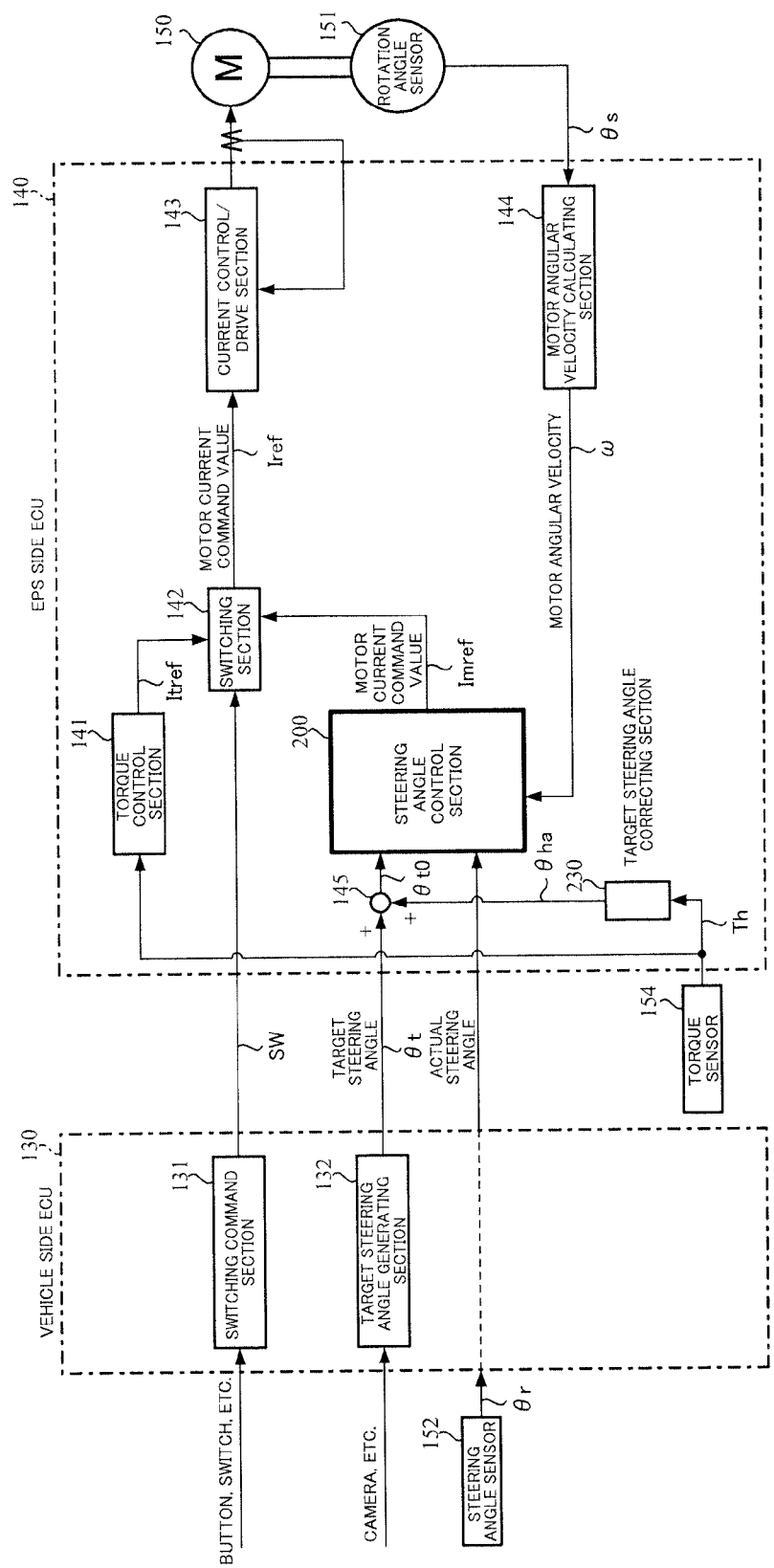
FIG. 3 is a block diagram showing a configuration example (the first embodiment) of the present invention.

FIG. 3 is a block diagram showing a configuration example (the first embodiment) of the present invention. As shown in FIG. 3, a rotation angle sensor 151 for detecting a motor rotation angle θs such as a resolver is connected to a motor 150, and the motor 150 is drive-controlled via a vehicle side ECU 130 and an EPS (Electric Power Steering apparatus) side ECU 140.

The vehicle side ECU 130 comprises a switching command section 131 that outputs a switching command SW of the automatic steering control or the manual steering control based on a button, a switch or the like indicating the intention of a driver and a target steering angle generating section 132 that generates a target steering angle θt based on a signal from a camera (image), a distance sensor or the like. Further, an actual steering angle θr detected by a steering angle sensor 152 provided on the column shaft (the steering shaft), is inputted into a steering angle control section 200 within the EPS side ECU 140 through the vehicle side ECU 130. The steering angle sensor 152 may be a steering angle estimation value based on the column shaft (including an intermediate shaft, a pinion shaft), the displacement of rack of the rack and pinion or a wheel velocity.

The switching command section 131 outputs the switching command SW based on a signal that identifies entering the automatic steering control, for example, based on the button or the switch indicating the intention of the driver that is provided on a dashboard or on the periphery of the steering wheel, or a vehicle state signal represented by a parking mode or the like provided on the shift, and then the switching command SW is inputted into a switching section 142 within the EPS side ECU 140. Further, the target steering angle generating section 132 generates the target steering angle θt based on data from the camera (image), the distance sensor or the like by means of a publicly-known method, and inputs the generated target steering angle θt into the steering angle control section 200 within the EPS side ECU 140.

The EPS side ECU 140 comprises a torque control section 141 that outputs a motor current command value Itref calculated as previously described based on the steering torque Th and the vehicle velocity Vel, a target steering angle correcting section 230 that inputs the steering torque Th and has a dead band for performing a target steering angle correction, a correction output section 145 that corrects the target steering angle θt with a target steering angle correction value θha to output, the steering angle control section 200 that calculates a motor current command value Imref for performing the steering angle automatic control based on a corrected target steering angle θt0 from the correction output section 145, the actual steering angle θr and the motor angular velocity ω and outputs the calculated motor current command value Imref, the switching section 142 that switches between the motor current command values Itref and Imref depending on the switching command SW, a current control/drive section 143 that drive-controls the motor 150 based on the motor current command value (Itref or Imref) from the switching section 142, and a motor angular velocity calculating section 144 that calculates the motor angular velocity ω based on the motor rotation angle θs from the rotation angle sensor 151. The switching section 142 switches between a torque control mode (the manual steering control) by the torque control section 141 and the automatic steering control by the steering angle control section 200 based on the switching command SW from the switching command section 131 of the vehicle side ECU 130, in the manual steering control, outputs the motor current command value Itref, and in the automatic steering control, outputs the motor current command value Imref. Further, the current control/drive section 143 comprises a PI current control section, a PWM control section, an inverter and so on.

Figure 4:
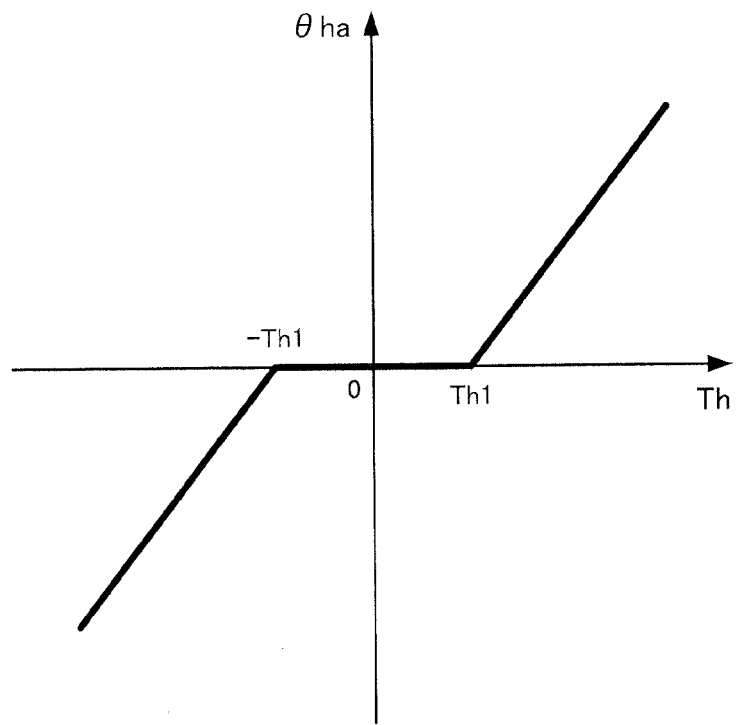
FIG. 4 is a block diagram showing a configuration example of a target steering angle correcting section.

Although the target steering angle correcting section 230 outputs the target steering angle correction value θha in a rapid steering performed in a case such as occurrence of abnormality, in particular in the case of a large steering torque, as shown in FIG. 4, the target steering angle correcting section 230 has the dead band (−Th1~+Th1) and outputs the target steering angle correction value θha according to the steering torque Th being equal to or more than ±Th1. The target steering angle correction value θha is inputted into the addition section 145 and added to the target steering angle θt to correct, and the corrected target steering angle θta is inputted into the steering angle control section 200.

In addition, a characteristic of FIG. 4 does not always have to be a linear line, may be a smooth curve or uses a map.

Figure 5:
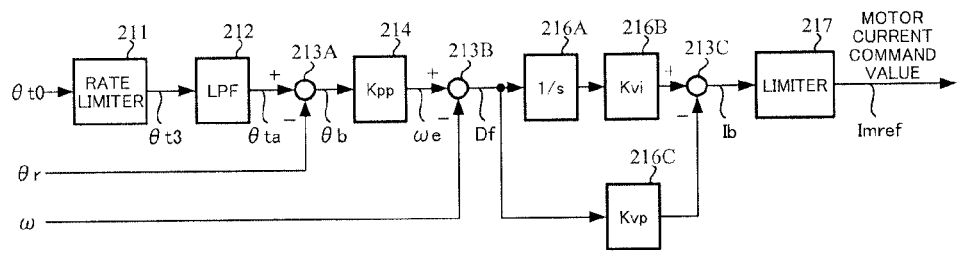
FIG. 5 is a block diagram showing a configuration example of a steering angle control section.

The steering angle control section 200 has a configuration shown in FIG. 5. As shown in FIG. 5, the corrected target steering angle θt0 (hereinafter referred to as "a correction target steering angle θt0") from the addition section 145 is inputted into a rate limiter 211 that performs a smoothing when the correction target steering angle θt0 changes rapidly, that is, makes the correction target steering angle θt0 change smoothly within the range of a predetermined time change rate, and a target steering angle θta passed through an LPF 212 for removing high-frequency disturbances is addition-inputted into a subtraction section 213A. The actual steering angle θr is subtraction-inputted into the subtraction section 213A, an angle deviation between the actual steering angle θr and the smoothed target steering angle θta, is multiplied by a gain Kpp in a proportional gain (Kpp) section 214 and then addition-inputted into a subtraction section 213B as a motor velocity command value ωe. The motor angular velocity ω from the motor angular velocity calculating section 144 is subtraction-inputted into the subtraction section 213B, the calculated velocity deviation Df is multiplied by a gain Kvi in an integral gain (Kvi) section 216B via an integral section 216A and then addition-inputted into a subtraction section 213C, and the velocity deviation Df is multiplied by a gain Kvp in a proportional gain (Kvp) section 216C and then subtraction-inputted into the subtraction section 213C. A motor current command value Ib being the subtraction result of the subtraction section 213C is outputted as the motor current command value Imref via a limiter 217 that limits the upper and lower limit values.

Figure 6:
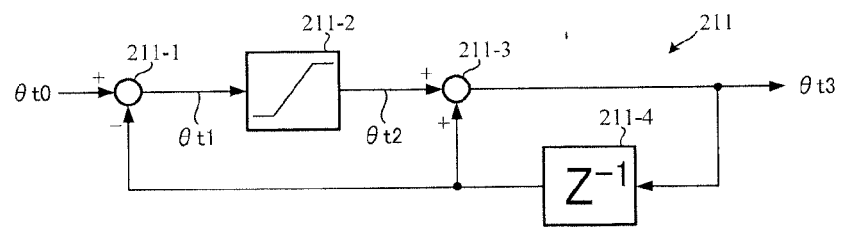
FIG. 6 is a block diagram showing a configuration example of a rate limiter.
Figure 7:
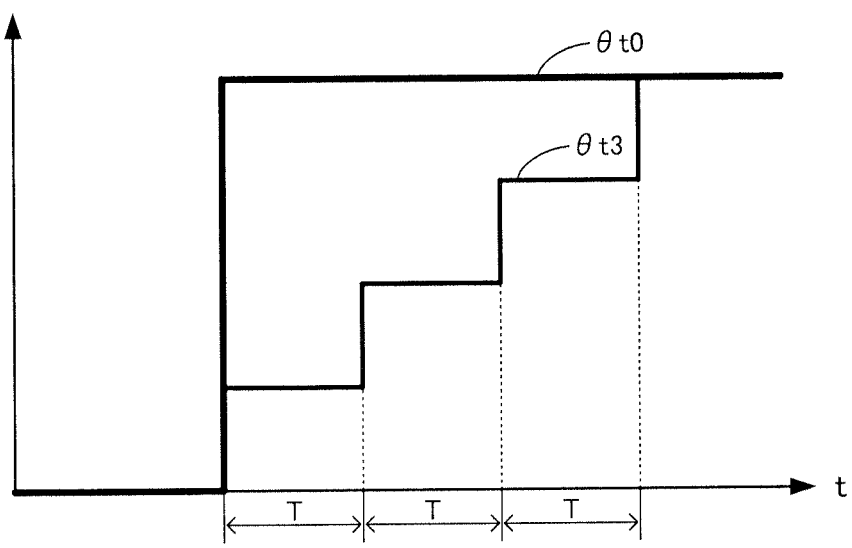
FIG. 7 is a block diagram showing a configuration example of a variation amount setting section.

The rate limiter 211 performs a smoothing with respect to the correction target steering angle θt0 and outputs the smoothed the correction target steering angle θt0 when the correction target steering angle θt0 changes rapidly, for example, has a configuration shown in FIG. 6. As shown in FIG. 6, the correction target steering angle θt0 is addition-inputted into a subtraction section 211-1, depending on a steering angle θt1 being the subtraction result obtained by subtracting a past value from the correction target steering angle θt0, a variation amount setting section 211-2 sets a variation amount θt2. The variation amount setting section 211-2 sets a difference θt1 between the past value from a holding section ($Z^{-1}$) 211-4 and the input (θt0), and the addition result obtained by adding the past value to the variation amount θt2 in an addition section 211-3 is outputted as a new target steering angle θϵt3. The variation amount setting section 211-2 makes the variation amount not exceeding an upper limit and a lower limit that are set, that characteristic obtains the difference with the input (correction target steering angle) θt0 at each of calculation periods T, in the case of falling outside the upper limit and the lower limit of the variation amount setting section 211-2, by repeatedly performing adding the difference to the past value, the output θt3 varies in a staircase pattern shown in FIG. 7 and finally matching the output θt3 with the correction target steering angle θt0. Further, in the case that the difference with the input (the correction target steering angle) θt0 is within the range of the upper limit and the lower limit of the variation amount setting section 211-2, since the variation amount θt2 (=the difference θt1) is outputted and added to the past value, the result output θt3 coincides with the input (the correction target steering angle) θt0. As these results, even if the correction target steering angle θt0 changes rapidly, it is possible to smoothly vary the correction target steering angle θt0 changing rapidly, a rapid current variation (i.e. a rapid steering) is prevented, and a function that reduces an uneasy feeling relating to the automatic operation of the driver is fulfilled.

Figure 8:
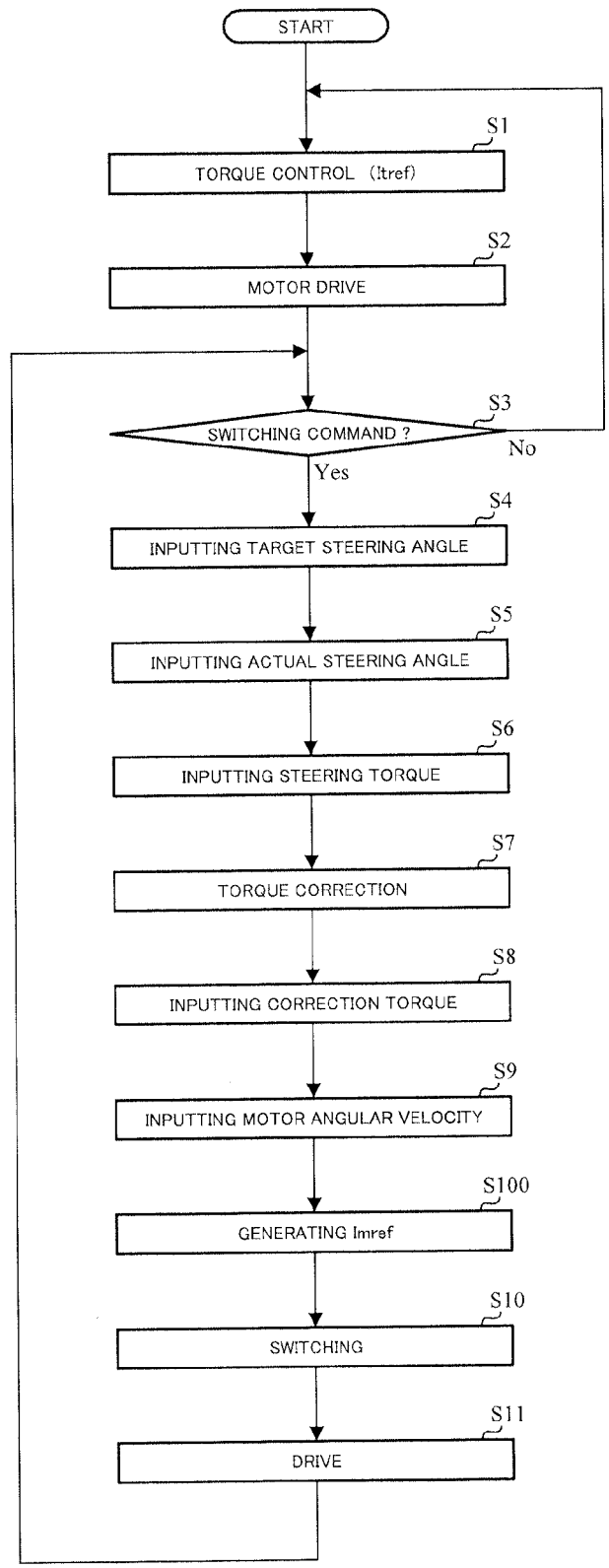
FIG. 8 is a flowchart showing an operation example of the present invention.

In such a configuration, an entire operation example of the present invention will be described with reference to a flowchart shown in FIG. 8.

When the operation of the steering system starts, the torque control by the torque control section 141 is carried out (Step S1), and the motor 150 is driven by using the motor current command value Itref and by means of the current control/drive section 143 (Step S2). The above operations are repeatedly performed until the switching command SW is outputted from the switching command section 131 (Step S3).

When becoming the automatic steering control and the switching command SW is outputted from the switching command section 131, the target steering angle θt is inputted from the target steering angle generating section 132 (Step S4), the actual steering angle θr is inputted from the steering angle sensor 152 (Step S5), the steering torque Th is inputted from the torque sensor 154 (Step S6), a correction by the steering torque Th is performed with respect to the target steering angle θt in the addition section 145 as the correction output section (Step S7), and the correction target steering angle θt0 is inputted (Step S8). Furthermore, the motor angular velocity ω is inputted from the motor angular velocity calculating section 144 (Step S9), and the motor current command value Imref is generated by the steering angle control section 200 (Step S100). Moreover, the target steering angle θt, the actual steering angle θr, the steering torque Th and the motor angular velocity ω can be inputted in an arbitrary order.

Thereafter, the switching section 142 is switched by the switching command SW from the switching command section 131 (Step S10), the motor 150 is driven by using the motor current command value Imref from the steering angle control section 200 and by means of the current control/drive section 143 (Step S11), and a return to the above Step S3 is made. The drive control based on the motor current command value Imref is repeatedly performed until the switching command SW is changed from the switching command section 131.

Figure 9:
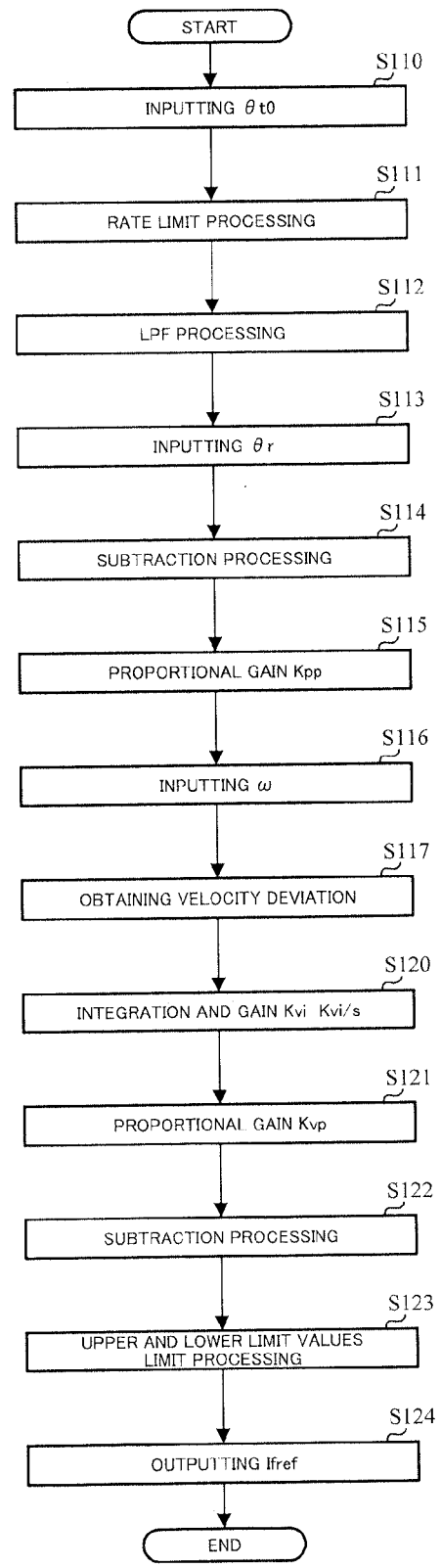
FIG. 9 is a flowchart showing an operation example of the steering angle control section.

Next, an operation example of the steering angle control section 200 will be described with reference to a flowchart shown in FIG. 9.

The correction target steering angle $θt0$ from the addition section 145 is inputted into the rate limiter 211 (Step S110), with respect to the correction target steering angle $θt0$, the rate limiting operation described as above is performed in the rate limiter 211 (Step S111) and further an LPF processing is performed in the LPF 212 (Step S112), and the target steering angle $θta$ that passed through these processes is inputted into the subtraction section 213A. Further, the actual steering angle Or is inputted from the steering angle sensor 152 (Step S113), the subtraction of "$θta-θr$" is performed in the subtraction section 213A (Step S114), and the angle deviation $θd$ being the subtraction result obtained in the subtraction section 213A is multiplied by the gain Kpp in the proportional gain section 214 and addition-inputted into the subtraction section 213B (Step S115). The motor angular velocity $ω$ is subtraction-inputted into the subtraction section 213B (Step S116), and the velocity deviation Df between the angular velocity $ωe$ that is multiplied by the gain Kpp and the motor angular velocity $ω$ is obtained (Step S117).

The velocity deviation Df obtained in the subtraction section 213B is integrated by the integral section 216A, multiplied by the gain Kvi in the integral gain section 216B and addition-inputted into the subtraction section 213C (Step S120). Further, the velocity deviation Df obtained in the subtraction section 213B is multiplied by the proportional gain Kvp in the proportional gain section 216C and subtraction-inputted into the subtraction section 213C (Step S121), the subtraction is performed in the subtraction section 213C, and the motor current command value Ib is outputted (Step S122). The motor current command value Ib is limited by the upper and lower limit values in the limiter 217 (Step S123) and outputted as the motor current command value Ifref (Step S124).

Figure 10:
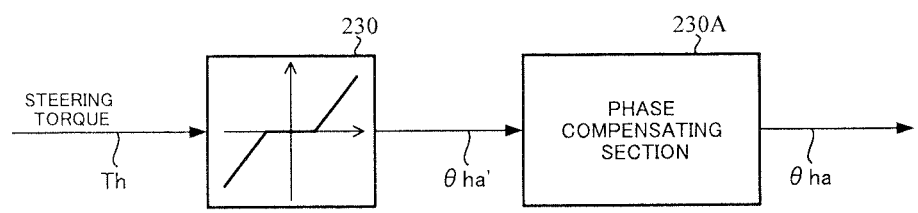
FIG. 10 is a block diagram showing another configuration of the target steering angle correcting section or a configuration example that a phase compensating section is provided in a post-stage of the target steering angle correcting section.

In switching from the automatic steering control to the manual steering control, the automatic steering control tries to modify a steering angle difference due to the manual steering control. This appears at the steering wheel as the feeling of being caught. In order to reduce this, a phase compensation (a phase-lead compensation) is performed with respect to the target steering angle correction value $θta$. FIG. 10 shows that a configuration example that a phase compensating section 230A is provided in a post-stage of the target steering angle correcting section 230. That is, the target steering angle correction value $θha$ obtained by performing the phase-lead compensation with respect to a target steering angle correction value $θha'$ from the target steering angle correcting section 230 in the phase compensating section 230A, is outputted. Further, it is also possible to provide a phase compensating section for performing the phase-lead compensation within the target steering angle correcting section 230 and output the phase-compensated target steering angle correction value $θha$ from the target steering angle correcting section 230.

In addition, except the phase compensation, compensations such as LPF, differential, integral and proportional items may be applied to the target steering angle correction value.

In order to enable the automatic control that the driver and the fellow passengers do not feel surprise and the discomfort feeling by suppressing the steering behavior and the vehicle behavior that have a rapid variation at the start of the steering by the automatic steering control, the present invention multiplies the motor velocity command value within the steering angle control section by a steering angle control gradual variation gain and provides a limiter that limits the upper and lower limit values with respect to the motor velocity command value after being multiplied by the gradual variation gain. It is possible for this limiter to change the limit value depending on the steering angle control gradual variation gain, and the motor velocity command value is limited depending on the steering angle control gradual variation gain by decreasing the limit value in the case that the steering angle control gradual variation gain is less than a threshold and increasing the limit value in the case that the steering angle control gradual variation gain is equal to or more than the threshold. Since changing of the limit value of the limiter is also gradually performed, the driver does not feel the discomfort feeling.

Figure 11:
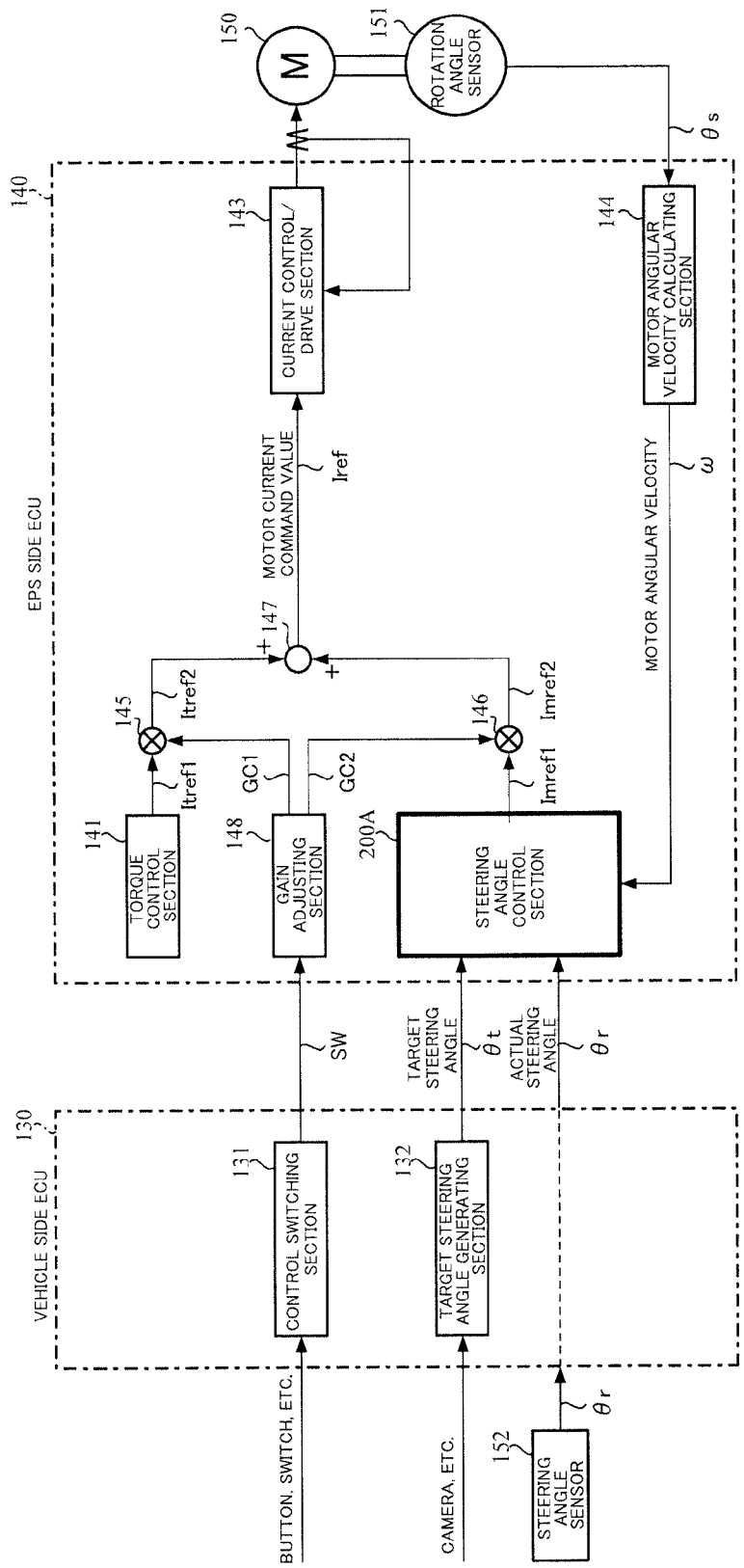
FIG. 11 is a block diagram showing a configuration example (the second embodiment) of the present invention.

FIG. 11 shows a configuration example (the second embodiment) of the present invention by corresponding to FIG. 3 of the first embodiment. As shown in FIG. 11, the torque sensor 154, the target steering angle correcting section 230, the switching section 142 and the addition section 145 are deleted from the first embodiment. Alternatively, the configuration of a steering angle control section 200A is changed, and a gain adjusting section 148, multiplication sections 145 and 146, and an addition section 147 are newly added.

The EPS side ECU 140 comprises the previously-mentioned torque control section 141, the steering angle control section 200A that calculates a current command value Imref1 for performing the automatic steering control based on the target steering angle $θt$, the actual steering angle Or and the motor angular velocity $ω$ and outputs the calculated current command value Imref1, the gain adjusting section 148 that outputs an assist control gradual variation gain GC1 for gradually varying a current command value Itref1 used for the assist control by the multiplication section 145 and a steering angle control gradual variation gain GC2 for gradually varying the current command value Imref1 from the steering angle control section 200A by the multiplication section 146 when the automatic steering control becomes "ON" according to a control switching command SW, the addition section 147 that adds a gradually-varied current command value Itref2 from the multiplication section 145 and a gradually-varied current command value Imref2 from the multiplication section 146 and outputs the motor current command value Iref, the previously-mentioned current control/drive section 143 and the previously-mentioned motor angular velocity calculating section 144.

Since a correlation exists between the assist control gradual variation gain GC1 and the steering angle control gradual variation gain GC2, when the steering angle control gradual variation gain GC2 varies in an increasing direction, the assist control gradual variation gain GC1 varies in a decreasing direction. Further, an output section is comprised of the multiplication sections 145 and 146 and the addition section 147.

Figure 12:
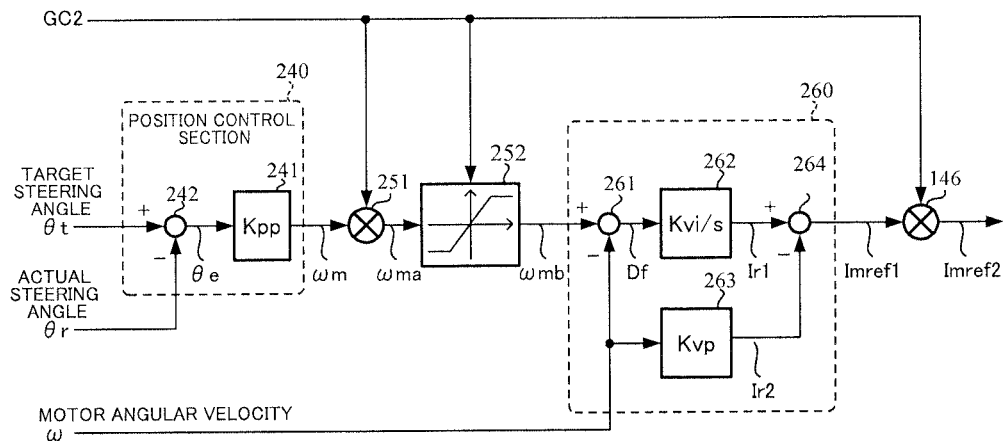
FIG. 12 is a block diagram showing a configuration example of the steering angle control section.
Figure 13:
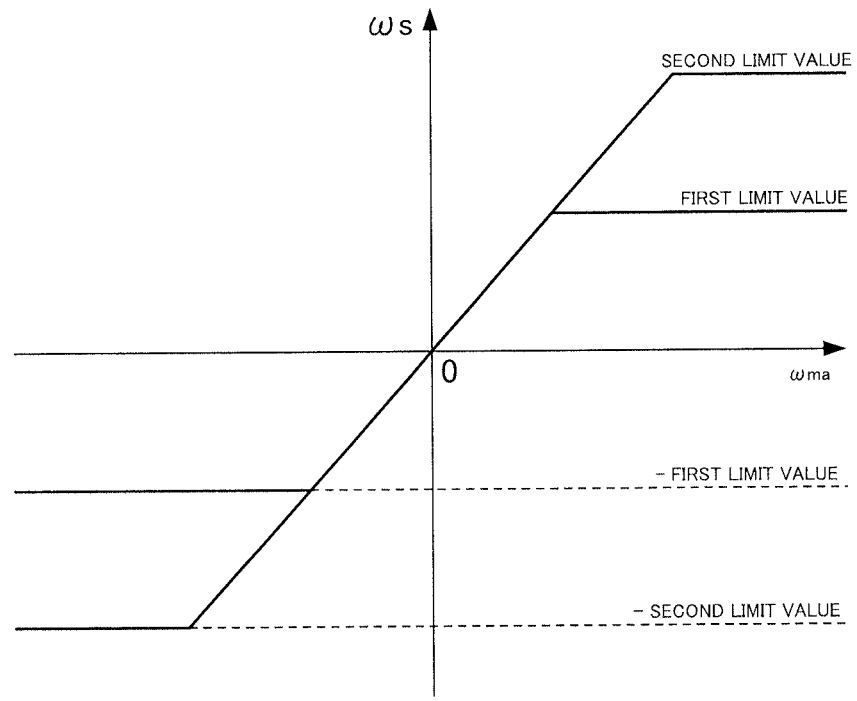
FIG. 13 is a characteristic diagram showing a characteristic of a limiter.

The steering angle control section 200A has a configuration shown in FIG. 12. As shown in FIG. 12, a deviation angle $θe$ between the target steering angle $θt$ and the actual steering angle $θr$ is obtained by a subtraction section 242 within a position control section 240, and the deviation angle $θe$ is multiplied by the gain Kpp in a gain section 241, inputted into a multiplication section 251 as a motor velocity command value $ωm$ and gradually varied by the steering angle control gradual variation gain GC2 from the gain adjusting section 148. A gradually-varied motor velocity command value ωma is inputted into a limiter 252 having a positive first limit value, a negative first limit value, a positive second limit value and a negative second limit value that are shown in FIG. 13. A motor velocity command value ωmb that the upper and lower limit values are limited by the limiter 252, is addition-inputted into a subtraction section 261 within a velocity control section 260. The motor angular velocity ω from the motor angular velocity calculating section 144 is subtraction-inputted into the subtraction section 261. The velocity deviation Df calculated in the subtraction section 261 is multiplied by a gain Kv and integrated in an integral section 262, and addition-inputted into a subtraction section 264 as a current command value Ir1. Further, the motor angular velocity ω is inputted into a gain section 263 within the velocity control section 260, and a current command value Ir2 obtained by multiplying the motor angular velocity ω by the gain Kvp is subtraction-inputted into the subtraction section 264. The subtraction result of the current command values Ir1 and Ir2 in the subtraction section 264 is outputted from the velocity control section 260 as the current command value Imref1 and inputted into the multiplication section 146. The steering angle control gradual variation gain GC2 is inputted into the multiplication section 146, and the gradually-varied current command value Imref2 is inputted into the addition section 147.

Figure 14:
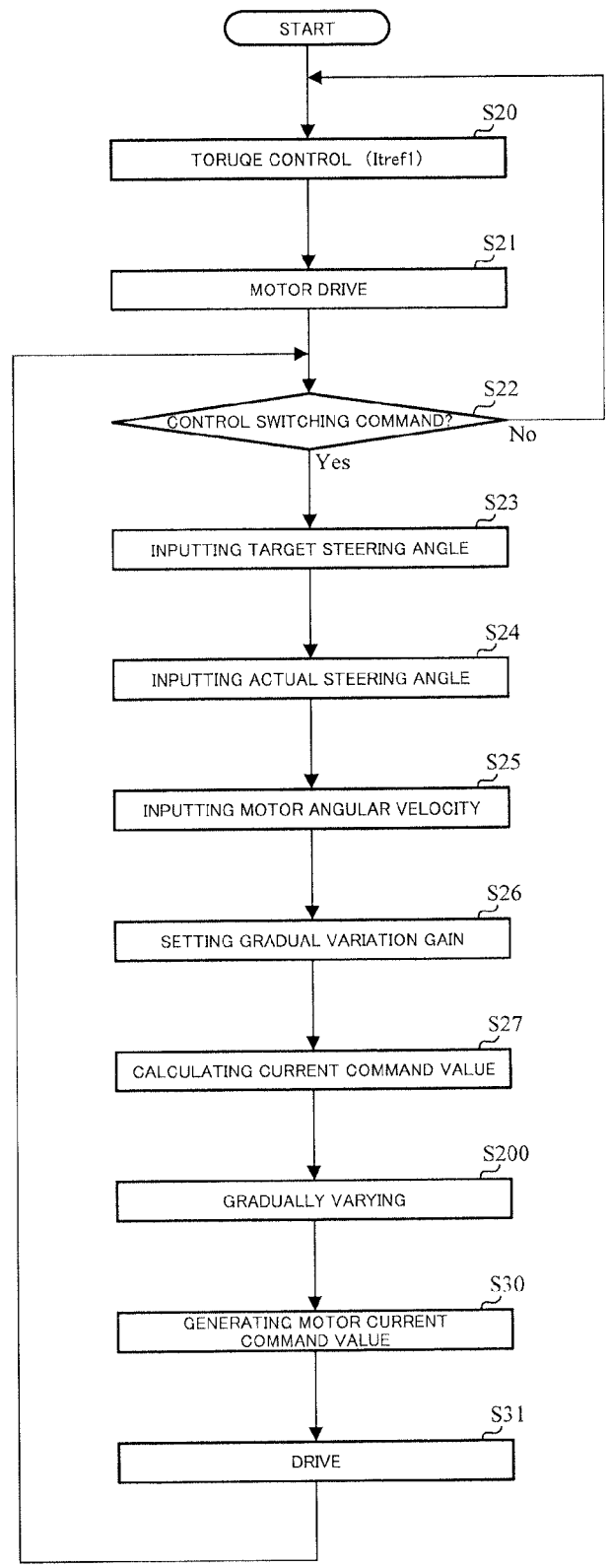
FIG. 14 is a flowchart showing an operation example of the present invention.

In such a configuration, an entire operation example of the present invention will be described with reference to a flowchart shown in FIG. 14.

When the operation of the steering system (the automatic steering control "OFF") starts, the torque control by the torque control section 141 is carried out (Step S20), and the motor 150 is driven by using the current command value Itref1 (=Itref2) and by means of the current control/drive section 143 (Step S21). The above operations are repeatedly performed until the control switching command SW is outputted from the switching command section 131 and the automatic steering control becomes "ON" (Step S22).

When the control switching command SW is outputted and the automatic steering control becomes "ON", and the control switching command SW is outputted from the switching command section 131, the target steering angle θt is inputted from the target steering angle generating section 132 (Step S23), the actual steering angle θr is inputted from the steering angle sensor 152 (Step S24), the motor angular velocity ω is inputted from the motor angular velocity calculating section 144 (Step S25), and the assist control gradual variation gain GC1 and the steering angle control gradual variation gain GC2 are set by the gain adjusting section 148 (Step S26). Moreover, the target steering angle θt, the actual steering angle θr and the motor angular velocity ω can be inputted in an arbitrary order.

Thereafter, the current command value Itref1 is calculated and outputted from the steering angle control section 200A, and the current command value Itref1 is calculated and outputted from the torque control section 141 (Step S27), the gradual variation is performed by the steering angle control gradual variation gain GC2 and the assist control gradual variation gain GC1 that are set (Step S200). That is, in the multiplication section 145, the current command value Itref1 is multiplied by the assist control gradual variation gain GC1 and the current command value Itref2 is outputted. Further, in the multiplication section 146, the current command value Imref1 is multiplied by the steering angle control gradual variation gain GC2 and the current command value Imref2 is outputted. The current command values Imref2 and Itref2 that the gradual variation processing is performed in this way are added in the addition section 147 to generate the motor current command value Iref (Step S30), the motor 150 is driven by the current control/drive section 143 (Step S31), and a return to the above Step S22 is made.

In addition, in the velocity control section 260, a velocity deviation Df (=ωmb−ω) between the motor velocity command value ωmb and the motor angular velocity ω is calculated by the subtraction section 261, the velocity deviation Df is inputted into the integral section 262 to be integrated and multiplied by the gain Kvi, and the calculated current command value Ir1 is addition-inputted into the subtraction section 264. The motor angular velocity ω is inputted into the gain section 263, and the current command value Ir2 obtained by multiplying the motor angular velocity ω by the gain Kvp is subtraction-inputted into the subtraction section 264. In the subtraction section 264, a deviation (=Ir1−Ir2) of the current command values Ir1 and Ir2 is calculated and outputted from the velocity control section 260 as the current command value Imref1.

Figure 15:
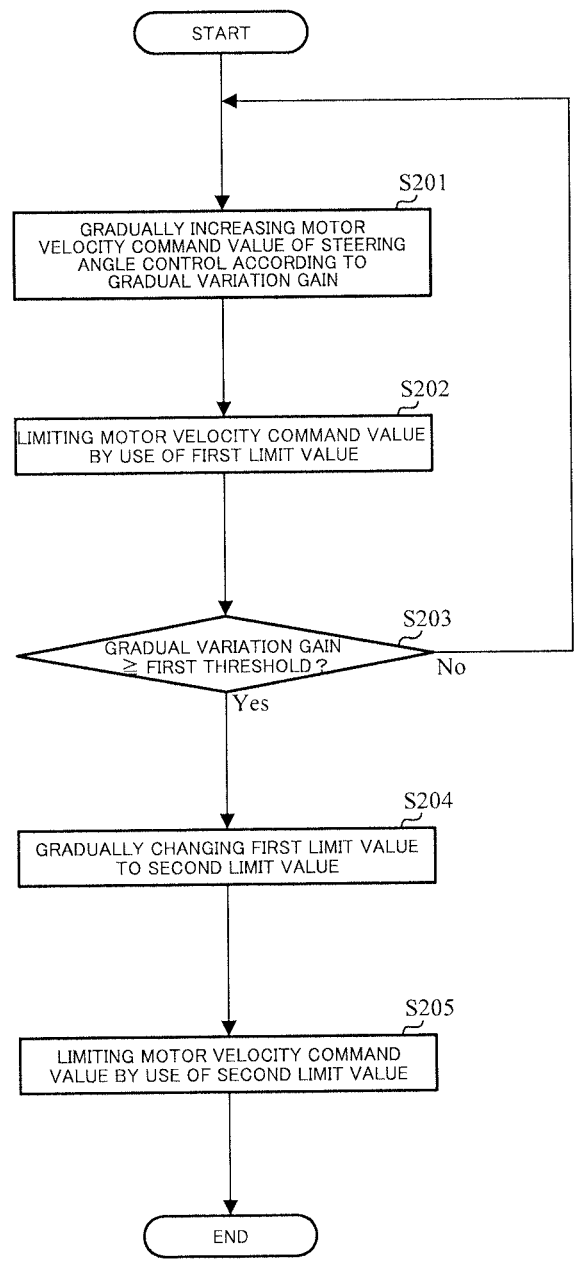
FIG. 15 is a flowchart showing an operation example of a gradual variation processing performed in the steering angle control section.

Next, an example of the gradual variation processing of the steering angle control section 200A will be described with reference to a flowchart shown in FIG. 15.

When the automatic steering control becomes "ON" in accordance with the control switching command SW, firstly, the motor velocity command value ωm for the steering angle control is gradually increased by the steering angle control gradual variation gain GC2 (Step S201), and the motor velocity command value ωmb is limited by a first limit value in the limiter 252 (Step S202). The above operations are repeatedly performed until the steering angle control gradual variation gain GC2 becomes equal to or more than a first threshold (Step S203), when the steering angle control gradual variation gain GC2 becomes equal to or more than the first threshold, the first limit value of the limiter 252 is gradually changed up to a second limit value (>the first limit value) (Step S204), and then the motor velocity command value ωmb is limited by the second limit value (Step S205).

Figure 16:
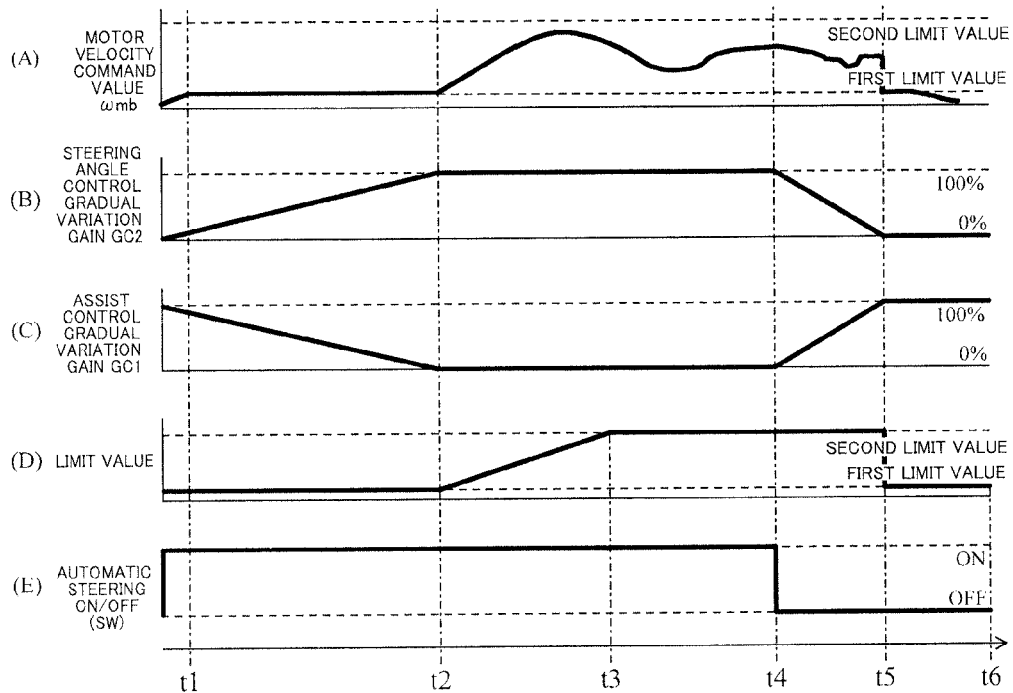
FIG. 16 is a time chart showing one example of the gradual variation processing.

FIG. 16 is a time chart showing an example of relationships among the motor velocity command value ωmb, the steering angle control gradual variation gain GC2, the assist control gradual variation gain GC1, the limit value of the limiter 252 and the automatic steering "ON/OFF(SW)" by time's passage.

The automatic steering control becomes "ON" at a time point t1, the steering angle control gradual variation gain GC2 that increases as shown in FIG. 16(B) is outputted from the gain adjusting section 148, and the assist control gradual variation gain GC1 that decreases as shown in FIG. 16(C) is outputted from the gain adjusting section 148. The limit processing is performed by the first limit value until the steering angle control gradual variation gain GC2 reaches the first threshold (in this example, 100%). Therefore, as shown in FIG. 16(A), the motor velocity command value ωmb becomes a value limited by the first limit value. Then, when the steering angle control gradual variation gain GC2 reaches 100% of the first threshold (at a time point t2), the limit value of the limiter 252 is gradually increased from the first limit value and shifted to the second limit value at a time point t3, thereafter, the limit processing is performed by the second limit value. The motor velocity command value ωmb being the output of the limiter 252 varies as shown in FIG. 16(A) since the time point t2, along with increase and change of the limit value of the limiter 252 shown in FIG. 16(D).

Thereafter, when the automatic steering becomes "OFF" at a time point t4, the steering angle control gradual variation gain GC2 that decreases as shown in FIG. 16(B) is outputted from the gain adjusting section 148, and the assist control gradual variation gain GC1 that increases as shown in FIG. 16(C) is outputted from the gain adjusting section 148. Thereafter, the limit processing is performed by the first limit value.

Figure 17:
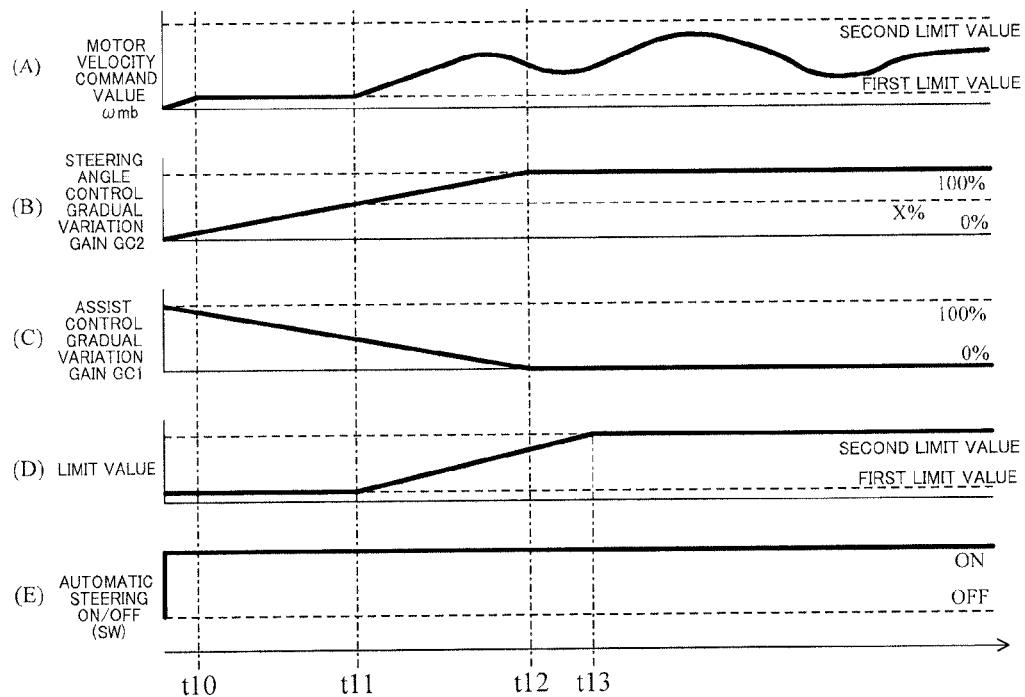
FIG. 17 is a time chart showing another example of the gradual variation processing.

In the example of FIG. 16, although the first threshold of the steering angle control gradual variation gain GC2 is described by 100%, in an example of FIG. 17, the first threshold is set to x %. The automatic steering control becomes "ON" at a time point t10, when the steering angle control gradual variation gain GC2 reaches the first threshold (x % (for example, 50%)) at a time point t11, since the time point t11, the limit value of the limiter 252 is gradually increased from the first limit value and shifted to the second limit value at a time point t13. According to this example, it is possible to improve quick responsibility while preventing excessive accumulation of the integral item.

In addition, although the gradual variation of the gradual variation gain and the limit value is linearly performed as described above, may be non-linearly performed. Further, although the steering angle control gradual variation gain and the gradual variation gain used in the motor velocity command value are identical as described above, maybe different characteristics independently. With respect to the steering angle control gradual variation gain and the assist control gradual variation gain, it is also possible to arbitrarily change gradual variation time and gradual variation timing.

Moreover, although the velocity control is a control object as described above, it is effective for a control method having a configuration that the input such as a requested steering angle or the like is accumulated and used in the output of the current command value or the like, when that configuration is incorporated into the position control and the velocity control, it is effective for any other configuration.

EXPLANATION OF REFERENCE NUMERALS 1 steering wheel
2 column shaft (steering shaft)
10,154 torque sensor
12,153 vehicle velocity sensor
13 battery
20,150 motor
21 motor driving section
100 control unit (ECU)
110 torque system control unit
120 motor system control unit
151 rotation angle sensor
152 steering angle sensor
130 vehicle side ECU
131 switching command section
132 target steering angle generating section
140 EPS side ECU
141 torque control section
142 switching section
143 current control/drive section
144 motor angular velocity calculating section
200,200A steering angle control section
211 rate limiter
211-2 variation amount setting section
211-4 holding section
214 proportional gain section
216A integral section
216B integral gain (Kvi) section
216C proportional gain (Kvp) section
217,252 limiter
230 target steering angle correcting section
240 position control section
260 velocity control section

The invention claimed is:

1. An electric power steering apparatus that calculates a first motor current command value based on a steering torque and a vehicle velocity, performs an assist control of a steering system by driving a motor based on said first motor current command value, and has a function for switching between an automatic steering control and a manual steering control, comprising:
   a target steering angle correcting section that outputs a target steering angle correction value for said steering torque;
   an addition section that adds said target steering angle correction value with a target steering angle and outputs a sum;
   a steering angle control section that calculates a second motor current command value based on said corrected target steering angle from said addition section, an actual steering angle and a motor angular velocity of said motor; and
   a switching section that inputs said first motor current command value and said second motor current command value to switch,
   wherein said target steering angle correcting section has a dead band in a region where said steering torque is small and outputs said target steering angle correction value so as to increase in a direction which is same as an increasing direction of said steering torque,
   wherein said steering angle control section comprises:
      a rate limiter that smooths said correction target steering angle;
      a first proportional gain section that multiplies an angle deviation between an output of said rate limiter and said actual steering angle by a proportional gain;
      an integral gain section that integrates a velocity deviation between a motor velocity command value from said first proportional gain section and said motor angular velocity and multiplies said integrated velocity deviation by an integral gain;
      a second proportional gain section that multiplies said velocity deviation by a proportional gain; and
      a subtraction section that obtains a deviation between an output of said integral gain section and an output of said second proportional gain section,
   wherein said subtraction section outputs said second motor current command value,
   wherein said switching section is switched depending on a switching command of said automatic steering control and said manual steering control, and said motor is drive-controlled based on said second motor current command value in said automatic steering control.

2. The electric power steering apparatus according to claim 1, wherein a low pass filter (LPF) is provided at a post-stage of said rate limiter.

3. The electric power steering apparatus according to claim 2, wherein said target steering angle correcting section includes a phase compensating section and outputs said target steering angle correction value on which a phase-lead compensation has been performed.

4. The electric power steering apparatus according to claim 1, wherein said target steering angle correcting section includes a phase compensating section and outputs said target steering angle correction value on which a phase-lead compensation has been performed.

5. An electric power steering apparatus that performs an assist control of a steering system by driving a motor based on a motor current command value, and has a function for switching between an automatic steering control and a manual steering control, comprising:
   a torque control section that calculates a first current command value in said manual steering control based on a steering torque and a vehicle velocity;
   a steering angle control section that calculates a second current command value in said automatic steering control so as to bring an actual steering angle close to a target steering angle set based on a moving target position of a vehicle;
   a gain adjusting section that generates a steering angle control gradual variation gain and an assist control gradual variation gain in said automatic steering control; and
   an addition section that multiplies said first current command value by said assist control gradual variation gain, multiplies said second current command value by said steering angle control gradual variation gain, performs an addition of said respective multiplication results and makes a result of said addition as said motor current command value,
   wherein said steering angle control section comprises:
      a position control section that calculates a first motor velocity command value based on a first deviation between said target steering angle and said actual target steering angle;
      a multiplication section that multiplies said first motor velocity command value from said position control section by said steering angle control gradual variation gain;
      a limiter that limits a second motor velocity command value from said multiplication section by upper and lower limit values; and
      a velocity control section that calculates said second current command value based on a third motor velocity command value from said limiter and a motor angular velocity.

6. The electric power steering apparatus according to claim 5, wherein said limiter has a plurality of limit values and changes said plural limit values depending on a magnitude of said steering angle control gradual variation gain with respect to a threshold.

7. The electric power steering apparatus according to claim 6, wherein changing of said plural limit values are gradually performed.

8. The electric power steering apparatus according to claim 7, wherein said steering angle control gradual variation gain and said assist control gradual variation gain have a correlation with each other.

9. The electric power steering apparatus according to claim 6, wherein said steering angle control gradual variation gain and said assist control gradual variation gain have a correlation with each other.

10. The electric power steering apparatus according to claim 5, wherein said steering angle control gradual variation gain and said assist control gradual variation gain have a correlation with each other.

* * * * *